United States Patent
Dotson (10) Patent No.: US 10,873,264 B2
(45) Date of Patent: Dec. 22, 2020

(54) AUTOMATION SYSTEM POWER OVER ETHERNET REDUNDANCY SYSTEM AND METHOD

(71) Applicant: ROCKWELL AUTOMATION TECHNOLOGIES, INC., Mayfield Heights, OH (US)

(72) Inventor: Gary D. Dotson, Muskego, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 490 days.

(21) Appl. No.: 15/624,253

(22) Filed: Jun. 15, 2017

(65) Prior Publication Data

US 2018/0367043 A1 Dec. 20, 2018

(51) Int. Cl.
*H02M 3/335* (2006.01)
*H02J 9/06* (2006.01)
*H04L 12/10* (2006.01)
*H04B 17/21* (2015.01)
*H02J 1/00* (2006.01)

(52) U.S. Cl.
CPC ......... *H02M 3/33523* (2013.01); *H02J 9/061* (2013.01); *H04B 17/21* (2015.01); *H04L 12/10* (2013.01); *H02J 1/00* (2013.01)

(58) Field of Classification Search
CPC ..... H02M 3/33523; H04L 12/10; H02J 9/061; H02J 1/00; H04B 17/21
See application file for complete search history.

(56) References Cited

U.S. PATENT DOCUMENTS

| | | | |
|---|---|---|---|
| 2005/0086546 A1* | 4/2005 | Darshan | H04L 69/24 713/300 |
| 2007/0132487 A1* | 6/2007 | Kestelli | H04L 25/0264 327/108 |
| 2008/0151457 A1* | 6/2008 | Apfel | H04L 12/10 361/111 |
| 2009/0243565 A1* | 10/2009 | Darshan | H04L 12/10 323/234 |
| 2011/0125341 A1* | 5/2011 | Heath | H04L 12/10 700/295 |
| 2012/0060042 A1* | 3/2012 | Buhari | G06F 1/266 713/320 |
| 2015/0094868 A1* | 4/2015 | Diab | G05B 19/4185 700/286 |
| 2017/0012788 A1* | 1/2017 | Rimboim | H04L 12/10 |
| 2017/0338969 A1* | 11/2017 | Paul | G06F 1/26 |

* cited by examiner

Primary Examiner — Jared Fureman
Assistant Examiner — Emmanuel Dominique
(74) Attorney, Agent, or Firm — Fletcher Yoder, P.C.

(57) ABSTRACT

There is provided a powered device configured to switch between a power over Ethernet (PoE) source and an auxiliary power source without restarting the device. A PoE circuit within the device includes a minimum load circuit which enables detection of the device by PoE power sourcing equipment (PSE) even when the device is powered by the auxiliary power source. The minimum load circuit may maintain a load of around 10 mA to simulate powered components, thereby enabling the PSE to reinitiate PoE even though the powered components of the device are at that time powered by the auxiliary power source. When the power supplied to the powered components by the PSE overcomes that of the auxiliary power source, the power scheme may automatically revert to PoE.

20 Claims, 10 Drawing Sheets

AUTOMATION SYSTEM POWER OVER ETHERNET REDUNDANCY SYSTEM AND METHOD

BACKGROUND

The present disclosure relates generally to automation systems, and to techniques for providing power over Ethernet for components of such systems. More specifically, the present techniques provide for supply of uninterrupted power for such components in the event of a failure.

Power over Ethernet (PoE) is used to supply power to a device through an Ethernet network. That is, devices such as, for example, telephones, local area network access points, webcams, Ethernet hubs, computers, etc. may be powered via an Ethernet cable. Power may be sent to a powered device (PD) via power sourcing equipment (PSE).

The Institute of Electrical and Electronics Engineers has promulgated a standard for PoE. IEEE 802.3 provides for 48 volts of DC power over two out of four available connector pairs on a standard "Category" cables. Data may also be transferred via the connector pairs used to carry power.

In implementing PoE, the PSE first conducts discovery, in which a voltage is applied across the connection and currents are measured to determine if an appropriate resistance is detected. If resistance is detected, the PSE may then classify the power level of the PD based on another detected resistance or may assume a default classification. Appropriate power is then supplied via the Ethernet network to the PD.

In the event of a failure, such as a disconnection of the Ethernet cables or a loss of power from the PSE, the PD may also be connected to an auxiliary power source. The PD may include a switch to determine when PoE is lost and convert to auxiliary power. In existing applications, the PD must generally be restarted after the failure has been corrected in order to return to PoE. That is, upon reconnection of the Ethernet cables or the PSE regaining power, the PD does not revert to PoE but rather continues to be powered by the auxiliary power source. This configuration may be problematic as the auxiliary power source may be a temporary device, such as a battery backup, which itself loses power after some time. In addition, it may be extremely inconvenient to restart the PD every time PoE is regained.

Such problems may be exacerbated by the environment in which powered devices are used. For example, in automation applications (e.g., factory automation) a high degree of reliability is required for system components, particularly components used to provide feedback, inputs, outputs, and information for operators and other personnel.

There is a need for solutions in PoE schemes to provide enhanced robustness in the event of failures, and particularly in automation systems.

BRIEF DESCRIPTION

In accordance with one aspect, the present disclosure presents an automation system comprising a monitoring and/or control component configured to control a machine or process, an Ethernet network coupled to the monitoring and/or control component for exchanging data during operation of the machine or process, and an input and/or output device coupled to the Ethernet network that, in operation, provides data to or receives data from the monitoring and/or control component via the Ethernet network and that is powered by a PoE scheme during operation. The input and/or output device comprises a minimum load circuit configured to maintain a minimum load in for the PoE scheme.

In accordance with another aspect, an automation system comprises an automation component configured to perform an automation operation on a monitored and/or controlled machine or process by exchanging data or signals with other automation components, and a PoE circuit. The PoE circuit comprises a detection circuit configured to enable detection of the automation component by power sourcing equipment, an isolation circuit configured to protect the automation component from current supplied by the power sourcing equipment during the detection of the automation component, and a minimum load circuit configured to maintain a minimum load on the PoE circuit to enable the detection of the automation component while the device is powered by an auxiliary power source.

The disclosure also relates to methods for implementing such technology. In accordance with one embodiment, a method comprises providing data and power to an automation component via a PoE connection, and switching a power source for the automation component from an auxiliary power source to a PoE source, wherein switching does not comprise restarting the powered device.

DRAWINGS

These and other features, aspects, and advantages of the present invention will become better understood when the following detailed description is read with reference to the accompanying drawings in which like characters represent like parts throughout the drawings, wherein:

FIGS. 6-9D are schematics of PoE schemes in accordance with embodiments of the present technology.

DETAILED DESCRIPTION

Figure 1:
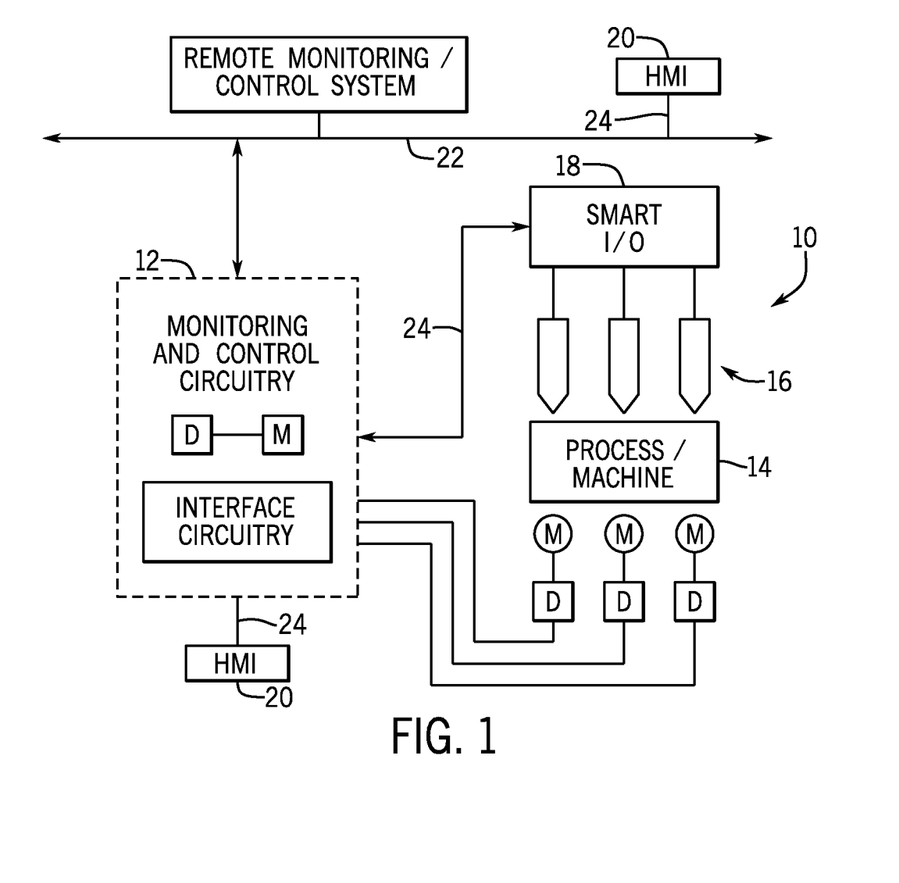
FIG. 1 is a perspective view of a system employing a PoE scheme in an automation application in accordance with an embodiment of the present technology.

Turning now to the figures, and referring first to FIG. 1, an exemplary automation system 10 employing a novel PoE scheme is illustrated. The system 10 generally includes monitoring and/or control circuitry 12 that, in operation, receives sensed signals and data from a machine or process 14, and provides output signals and data for the control of the machine or process. The monitoring and/or control circuitry 12 will comprise one or more processors P and associated memory M. The memory may store programming code executed by the processor in carrying out the monitoring and/or control functions, typically in real or near-real time, as well as configuration settings, routines, error logs, and any number of useful data for the operations regulated by the monitoring and/or control circuitry. Interface circuitry will also be provided that aids in communicating with external devices, including via powered Ethernet connections, as summarized below.

The parts and components of the machine or process 14 will typically be driven by motors M which are in turn, driven by power signals from motor drives D. Any of a variety of actuators may be used, including such rotary motors, linear motors, solenoid-actuated devices, and so forth. Instrumentation, such as sensors 16 are provide to sense operating parameters of the machine or process and to provide representative signals and/or data, such as through input/output interfaces 18 (sometimes referred to as "I/O") to the monitoring and/or control circuitry. As discussed in greater detail below, such I/O may represent one form of PoE component with which data is exchanged and power provided by the PoE scheme disclosed. Other components of the system may include various types of human machine interface or HMI, as indicated by reference numeral 20. Many other systems, devices, and components may also be provided, including remote monitoring and/or control systems, and these may be coupled to exchange data with the monitoring and/or control circuitry by a network 22. Where HMIs 20 are provided, these may be powered by Ether net cabling 24 that may itself extend between the powered devices and the circuitry with which they exchange data. Such cabling is illustrated, by way of example, between the circuitry 12 an HMI 20, between the I/O 18 and the circuitry 12, and between the network 22 and another HMI 20. In terms of the PoE scheme discussed here, the network or the circuitry 12 may serve as the PSE, and such PSEs may be local to the powered devices (e.g., 18, 20) or may be located remotely and connected via the network.

Figure 2:
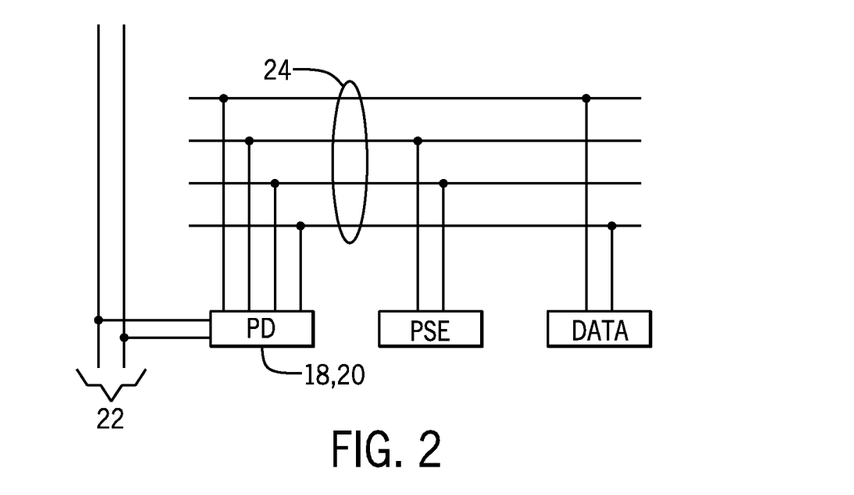
FIG. 2 is a block diagram of the system illustrated in FIG. 1.

FIG. 2 is a diagrammatical illustration of a part of the system illustrated in FIG. 1. In the illustrated embodiment, a powered device or PD 18, 20 is connected to the Ethernet network via the cable 24. The cable may, for example, be a "Category" with twisted cable pairs terminating at each end in pins in a standard modular jack. The pairs may be connected to pairs of twisted cables in the Ethernet network. The Ethernet network may in turn be connected to one or more sources of power, as indicated by block PSE in FIG. 2, as well as to non-powered data sources. The PSE may be connected to only two of the available pairs to provide supply the power. The data source may be coupled to another available pair, as illustrated, or may be coupled to all available pairs, as in gigabit Ethernet connections. In addition, a two pair twisted Ethernet cable (not shown) may be utilized, and power and data may both be sent over the same two pairs in the cable. In addition to being connected to the Ethernet network, the PD 12, 20 may be connected to the auxiliary power source or network 22. For example, a standard power cable may be utilized to connect the PD 18 20 to the power grid.

Figure 3:
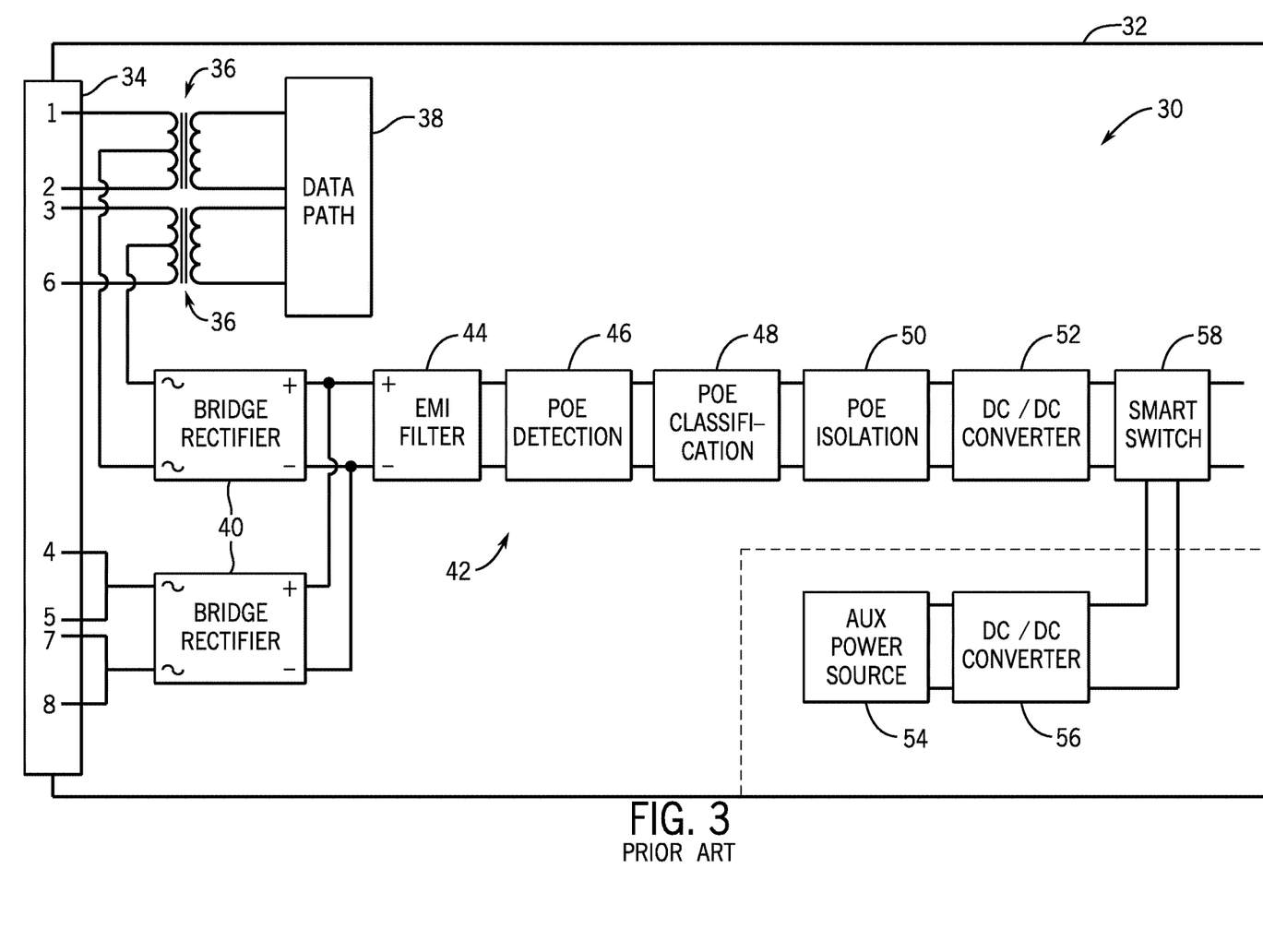
FIG. 3 is a block diagram of a prior art PoE.

FIG. 3 illustrates a block diagram of a PoE circuit 30 in a powered device 32 in accordance with the prior art. Specifically, an Ethernet connector 34 may be provided to enable connection of the PD 32 to the PSE 12 (FIG. 1) via the Ethernet network 18 (FIG. 1). In this example, four pairs of wires are utilized to transfer data and transmit power in the PD 32. Two of the four pairs are generally utilized for data transmission, while all four pairs may be used to transmit power. The two data transmission wire pairs may be coupled to a data path 38 via transformers 36. Current from all four wire pairs may travel through rectifier bridges 40 to a power path 42. The power path 42 includes an electromagnetic interference (EMI) filter 44, a PoE detection circuit 46, a PoE classification circuit 48, and a PoE isolation circuit 50, all of which are described in more detail below. The filtered current then goes through a DC/DC converter 52 to ensure a stable supply of power to the PD 32. An auxiliary power source 54 may also supply power to the PD 32 in the event that power from the PSE is insufficient or lost. Power from the auxiliary power source 54 goes through a separate DC/DC converter 56. A smart switch 58 determines if power from the Ethernet network is lost or drops below an acceptable level and switches to the auxiliary power source 54. After detection of the PD 32, the PSE will supply power only if a minimum load is maintained. Accordingly, PoE is not reinitiated when sufficient power is again available from the PSE because there is no load on the circuit 30 due to the device 32 being powered by the auxiliary power source 54.

Figure 4:
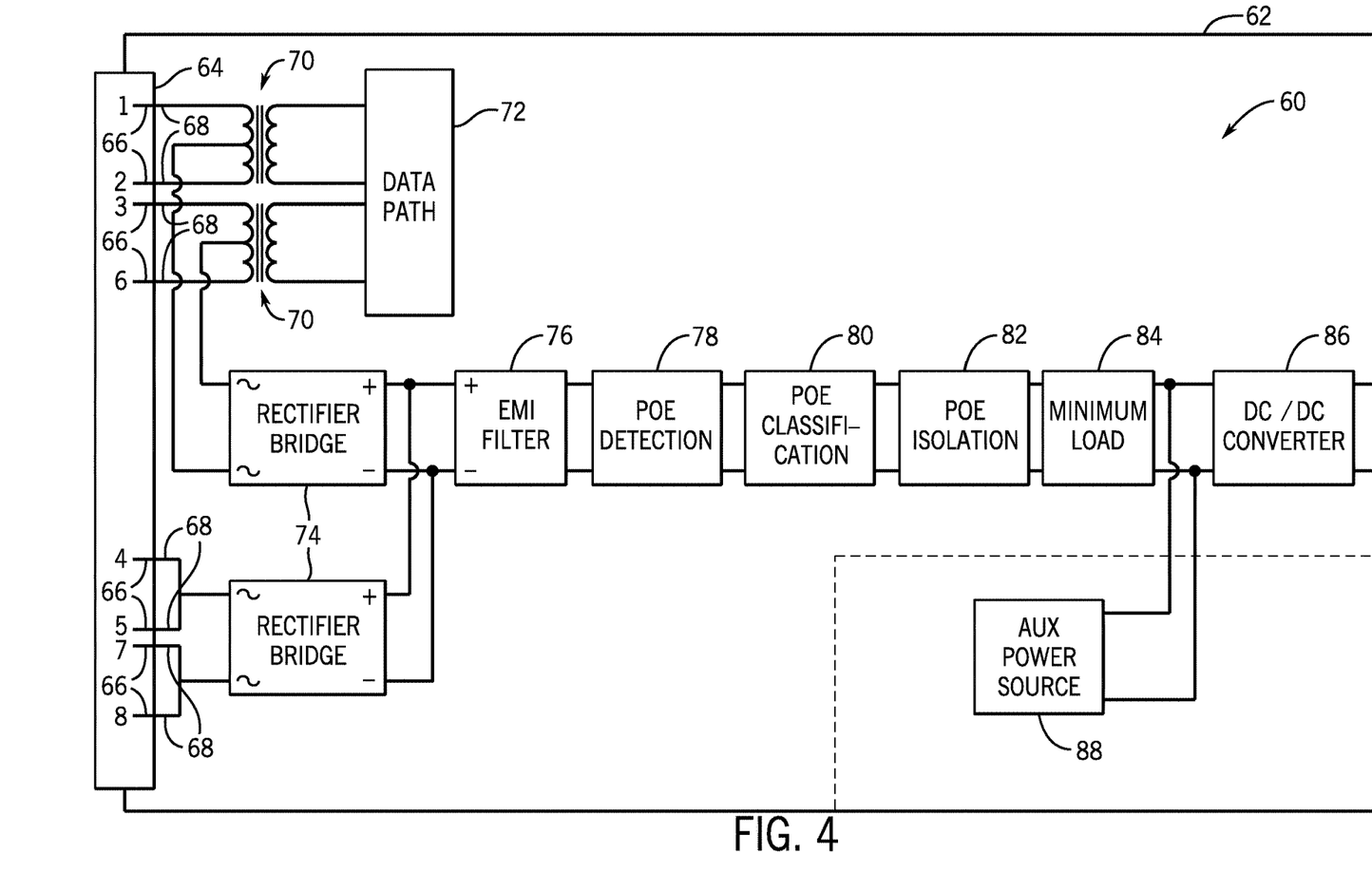
FIG. 4 is a block diagram of a PoE scheme in accordance with the present disclosure.

FIG. 4 illustrates a PoE circuit 60 in a powered device 62 in accordance with an embodiment of the present invention. An Ethernet connector 64 may be coupled to the cable (FIG. 1). In the illustrated embodiment, the Ethernet connector 64 is a standard modular jack with eight connection pins 66. Each connection pin 66 is coupled to a wire 68. The 1/2 and 3/6 wire pairs are utilized for data transfer via transformers 70. A data path 72 transfers data from the transformers 70 to data processing components of the PD 62.

The 1/2, 3/6, 4/5, and 7/8 wire pairs are utilized to provide power to the PD 62. Bridge rectifiers 74 convert alternating current to direct current. The bridge rectifiers 74 may be coupled to an electromagnetic interference filter (EMI) 76. The EMI filter 76 reduces noise in the current from electromagnetic radiation incident on the PoE circuit 60. A PoE detection circuit 78 may then be utilized to alert to the PSE that the PD 62 is present and requires power. During detection, the PSE may transmit a 1.8-10 volt signal for approximately 500 mseconds. The PSE may measure resistance or capacitance of the detection circuit 78, and if the measured value is within a standard range the PSE may supply power to the PD 62. The detection circuit 78 may have a 25 kohm resistor signature to indicate that the PD 62 is compliant with IEEE 802.3af standards.

The level of power supplied to the PD 62 may be determined by supplying voltage to a classification circuit 80. During classification, the PSE may transmit about 18 volts for approximately 50 mseconds. The classification is based on the current consumed by the PD 62 while a constant voltage is applied. According to IEEE standards, there are five PoE classifications, namely zero through four. Class zero is the default and indicates a maximum power level of 0.44-12.95 watts at the inlet of the PD 32. Class one indicates a maximum of 0.44-3.84 watts, class two indicates a maximum of 3.84-6.49 watts, and class three indicates a maximum of 6.49-12.95 watts. After classification, power is supplied to the PD 62 from the PSE based on the determined classification. For example, the PSE may send 25-96 volts to the PD 62, depending on need. Generally, the PSE may provide 48 volts and 15.4 watts of power to the PD 62.

A PoE isolation circuit 82 enables current to pass through to the PD 62 when power is supplied from the PSE. For example, during detection and classification the isolation circuit 82 may prevent current from passing through to the PD 62. When the voltage supplied by the PSE exceeds the values associated with detection and classification, the isolation circuit 82 may enable current to pass through and power the PD 62.

In accordance with an aspect of the present invention, a minimum load may be maintained on the PoE circuit 60 by a minimum load circuit 84. The minimum load circuit 84 may maintain a current of approximately 10 mA such that the PSE again supplies power to the PD 62 upon reconnection of the PD 62 to the PSE via the Ethernet network. That is, after detection of the PD 62, the minimum load circuit 84 maintains a minimum load simulating powered components, thereby enabling the PSE to reinitiate PoE. Embodiments of the minimum load circuit 84 are described below. A DC/DC converter 86 may then be utilized to regulate the DC power supplied to the PD 62 from the PSE.

In addition to the PoE connection, the PD 62 may be coupled to an auxiliary power source 88. The auxiliary power source 88 may be internal to the PD 62 or may be external, such as, for example, a battery backup, a UPS, a power grid, etc. If power via the Ethernet connection is lost or greatly reduced for any reason, the PD 62 may be powered by the auxiliary power source 88. Generally, the PD 62 may switch to the auxiliary power source 88 if the power supplied from the PSE decreases to less than 24 volts. Because the minimum load circuit 84 enables the PD 62 to be rediscovered without restarting the PD 62, the auxiliary power source 88 may supply power to the PD 62 until the Ethernet power is reconnected or reaches an adequate level to once again power the PD 62. For example, the PD 62 may revert to PoE when the voltage supplied by the PSE 14 exceeds the voltage supplied by the auxiliary power source 88. This feature enables continuous use of the PD 62 even after a power failure or network disconnection.

Figure 5:
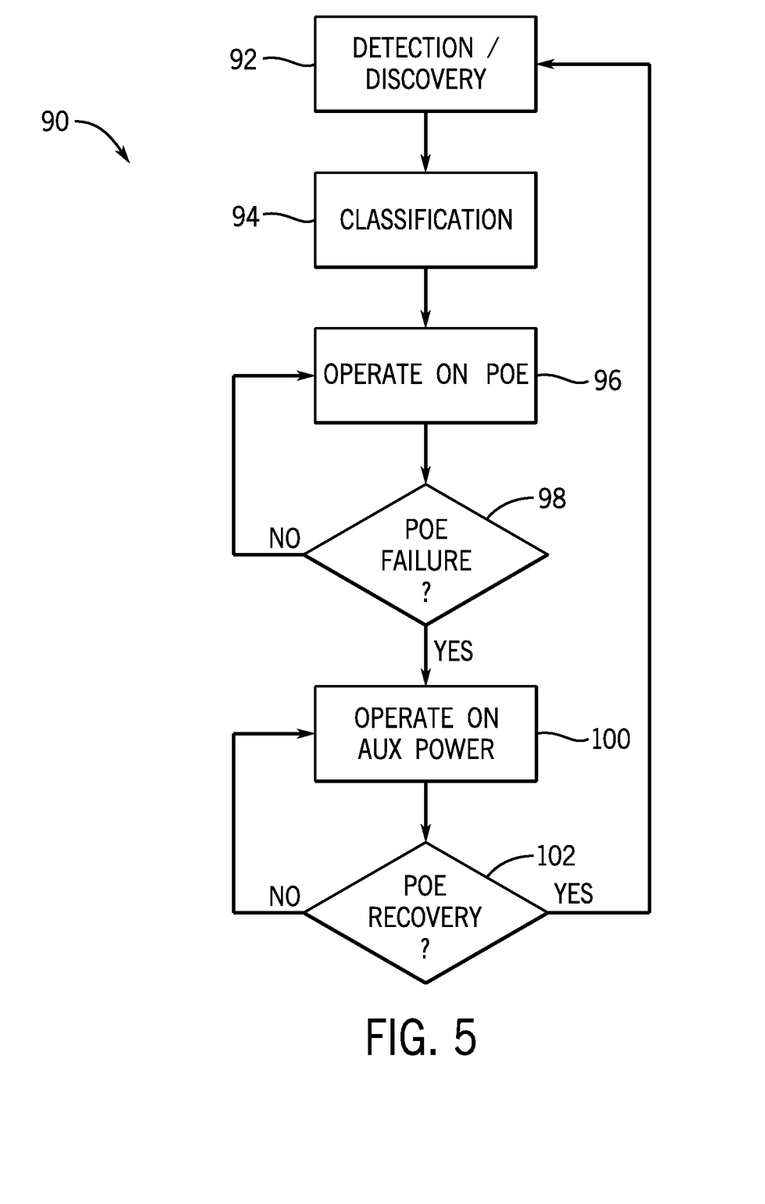
FIG. 5 is a flow chart of the PoE scheme illustrated in FIG. 4.

FIG. 5 is a flow chart illustrating an exemplary process 90 by which the PoE circuit 60 (FIG. 4) may operate to maintain power to the PD 62. Upon connection of the PD 62 to the Ethernet network 18 (FIG. 1), the PSE may detect or discover the PD 62 (block 92). In the detection step (block 92), the PSE may send a signal to the detection circuit 78 to determine if the PD 62 requires power via the network and to ensure that the PD 62 is properly configured to receive PoE. For example, the PSE may transmit a 1.8-10 volt signal for approximately 500 mseconds and measure the resistance of the detection circuit 78. If the measured value is within an expected range, the detection step (block 92) is successful. For example, a resistance signature of 25 kohms indicates that the PD 62 is IEEE compliant.

After detection, the PD 62 may be classified (block 94). That is, the amount of power required to operate the PD 62 may be determined. In the classification step (block 94), the PSE may send a signal to the classification circuit 80 to determine the proper power level class for the PD 62. For example, the PSE may transmit a 12.5-25 volt signal to the classification circuit 80 for approximately 50 mseconds. The power level class may be based on a measured resistance in the classification circuit 80. The appropriate level of power may then be supplied to the PD 62 (block 96).

The PSE 14 may continue to supply power to the PD 62 until power is no longer drawn for a period of time, or a failure occurs (block 98). For example, if the PD 62 draws less than 5 mA of current for 400 mseconds, the PSE may stop supplying power to the PD 62. Failure may be a result of interruption of the Ethernet connection between the PSE 14 and PD 62 for any reason. For example, the PSE or the PD 32 may be disconnected from the Ethernet network 18, or the lines providing the network 18 may be severed. Furthermore, if the PSE loses power it may no longer be able to provide power to the PD 32.

Upon failure of the PoE, the PD 63 may begin to operate on auxiliary power (block 100). The transition from PoE to auxiliary power may be automated such that the PD 62 does not power off during the transition. The PSE may again be able to supply power via the network to the PD 62 (block 102). Upon recovery of the PoE, the PD 62 may again be discovered (block 92) and classified (block 94). Power to the PD 62 may then be supplied by the PSE (block 98) rather than the auxiliary power source 88.

FIGS. 6-9D are schematics of exemplary PoE circuits as illustrated in FIG. 4. In an exemplary circuit 110 illustrated in FIG. 6, the detection circuit 78 may include a resistor 112 and a capacitor 114 in parallel (see FIG. 9A). While the IEEE 802.3af standard calls for a signature resistance of about 25 kohms, pre-standard power equipment may detect the PD 62 (FIG. 4) based on signature capacitance. Accordingly, the detection circuit 78 may include both the resistor 112 and the capacitor 114.

Figure 6:
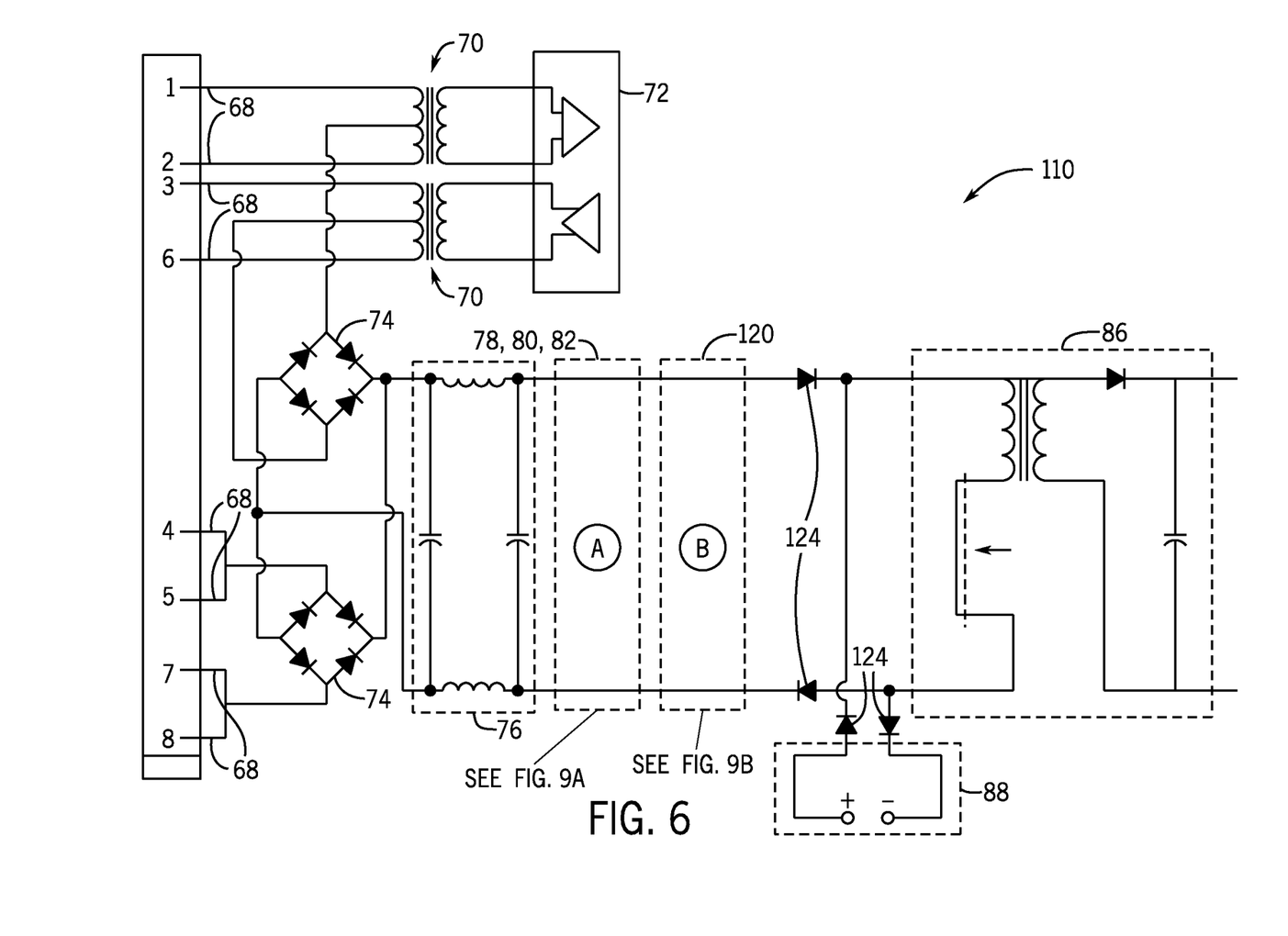

The classification circuit 80 may include multiple switches, for example, in the form of Zener diodes and transistors. The PSE classifies the PD 62 based on the overall resistance signature of the classification circuit 80. A resistor 116 may be principally responsible for the detected resistance signature of the classification circuit 80. The isolation circuit 82 operates as a switch to prevent power from passing through during detection and classification. When the PSE increases the voltage to the PD 62 enough to overcome a switch 118, such as a Zener diode, current may flow through the isolation circuit 82 to the powered components of the PD 62.

Figure 9A:
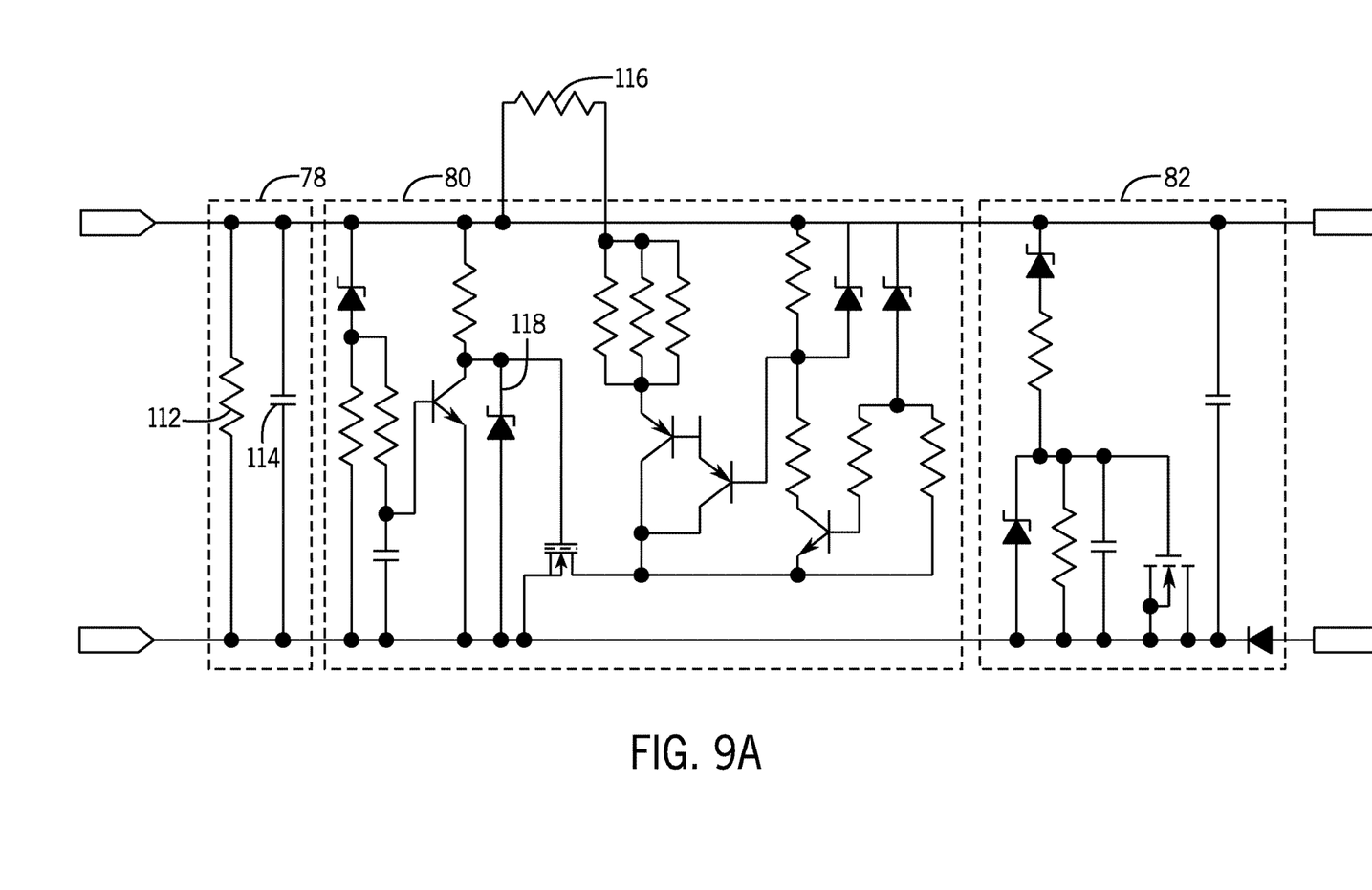
Figure 9B:
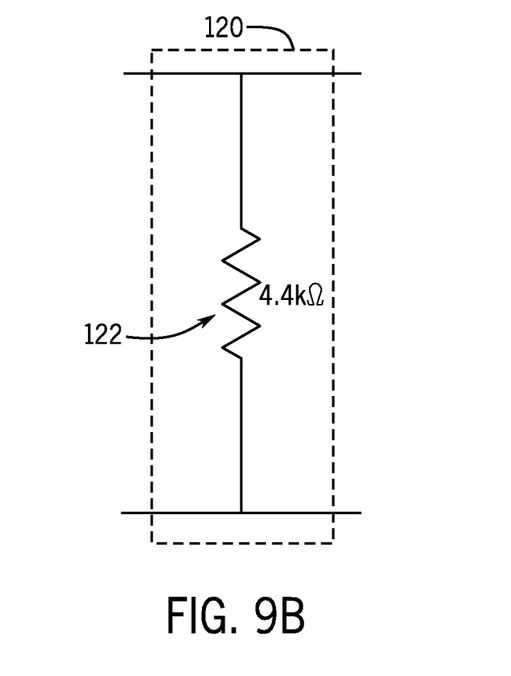

An exemplary minimum load circuit 120 (see FIG. 9B) may continuously draw current even in the event that the PD 62 has switched to auxiliary power. The minimum load circuit 120 may include a resistor 122. For example, the resistor 122 may have a resistance of 4.4 kohms such that a 44 volt signal across the resistor 122 produces 10 ampers of current. This current may be the minimum load to ensure that the PSE 14 detects and reconnects to the PD 62 after a failure. In addition, due to the nature of the minimum load circuit 120, some power loss may occur even after the PD 62 is powered by the PSE 14. The minimum load circuit 120 may then be coupled to the DC/DC converter 86. Additionally, the auxiliary power source 88 may be coupled to the DC/DC converter 86. Diodes 124 prevent current from leaking between the PoE circuit 110 and the auxiliary power source 88 and provide an automatic switch between the power sources. That is, when the power supplied to the DC/DC converter 86 by the PSE 14 becomes greater than that supplied by the auxiliary power source 88, the PD 62 automatically switches to the PoE scheme.

Figure 7:
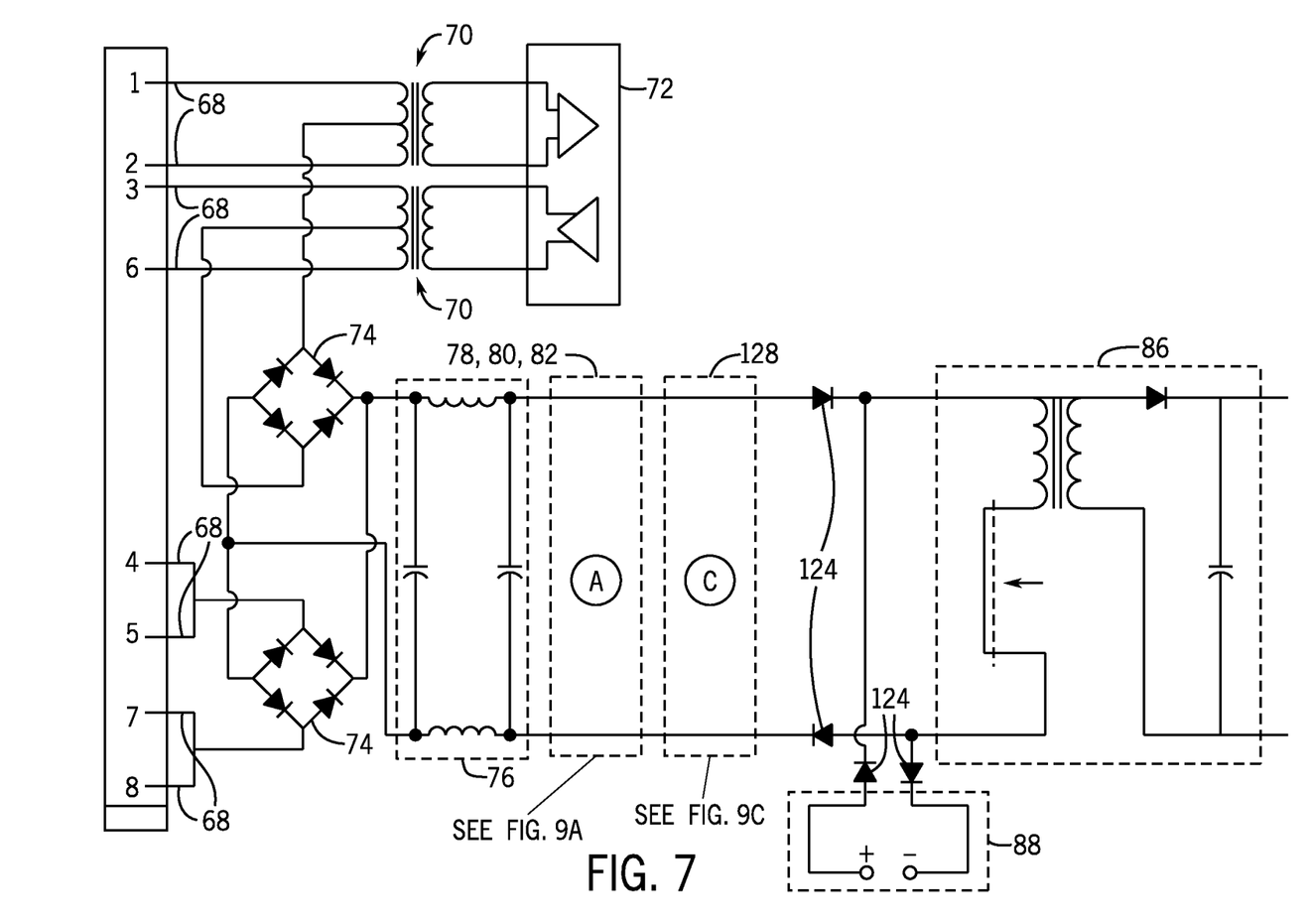
Figure 9C:
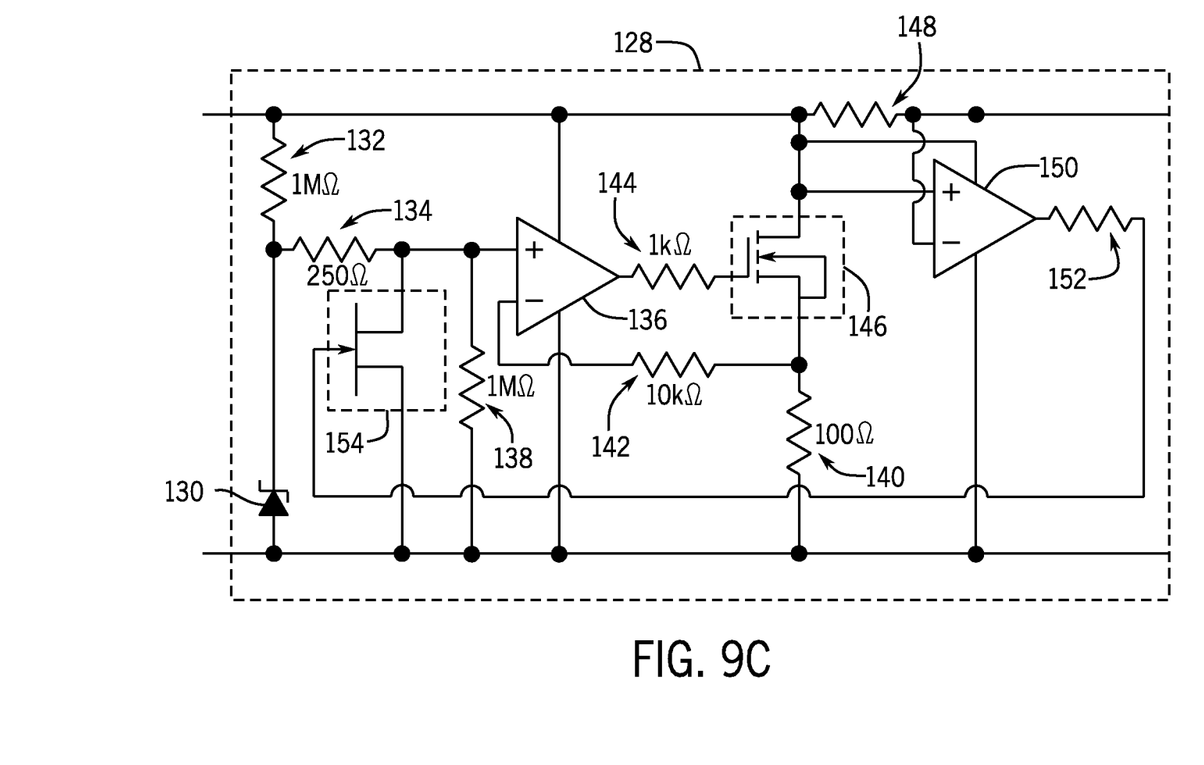

FIG. 7 illustrates an exemplary PoE circuit 126, including many of the same elements described above. Another exemplary minimum load circuit 128 (see FIG. 9C) may also provide at least a 10 mA current to ensure reconnection of the PD 62 to the PSE 14 in the event of a failure. A Zener diode 130 regulates voltage through the minimum load circuit 128. In an exemplary embodiment, the Zener diode 130 may be a 1.25 volt diode. Current is then routed through a resistor 132 and a resistor 134. In the illustrated embodiment, the resistor 132 is a 1 megaohm resistor, and the resistor 134 is a 250 kohm resistor. A comparator 136, such as an operational amplifier, receives a non-inverting voltage input from the resistor 134 and a resistor 138. An inverting voltage input to the comparator 136 may be supplied through a resistor 140 and a resistor 142. In the illustrated embodiment, the resistor 140 is 100 ohms and the resistor 142 is 10 kohms. The output voltage from the comparator 136 may pass through a resistor 144 that is, for example, 1 kohm. If the voltage from the comparator 136 is greater than a threshold voltage of a switch 146, such as a metal-oxide-semiconductor (MOSFET), the switch 146 may be turned on. When the voltage output from the comparator 136 decreases below the threshold voltage, the switch 146 may be turned off. While the switch 146 is open, current may transfer between the positive and negative channels of the PoE circuit 128 via the resistor 140.

Additionally, the minimum load circuit 128 may maintain the minimum load only while operating power is not supplied to the PD 62. That is, upon detection of a current through a resistor 148, the minimum load circuit 128 may stop drawing power from the PoE circuit 126. For example, if a comparator 150, such as an operational amplifier, senses a voltage drop across the resistor 148, the output voltage of the comparator 150 may be reduced via a resistor 152 then routed to a switch 154, such as a junction gate field-effect transistor (JFET). If the voltage to the switch 154 becomes great enough to overcome the gate source voltage, the switch 154 may be turned off such that current is significantly impeded from traveling therethrough. By turning off the switch 154, the inverting and non-inverting inputs to the comparator 136 are driven together, and voltage output from the comparator 136 approaches zero. When the voltage output from the comparator decreases below the threshold voltage of the switch 146, the switch 46 is turned off such that current may not travel therethrough.

Figure 8:
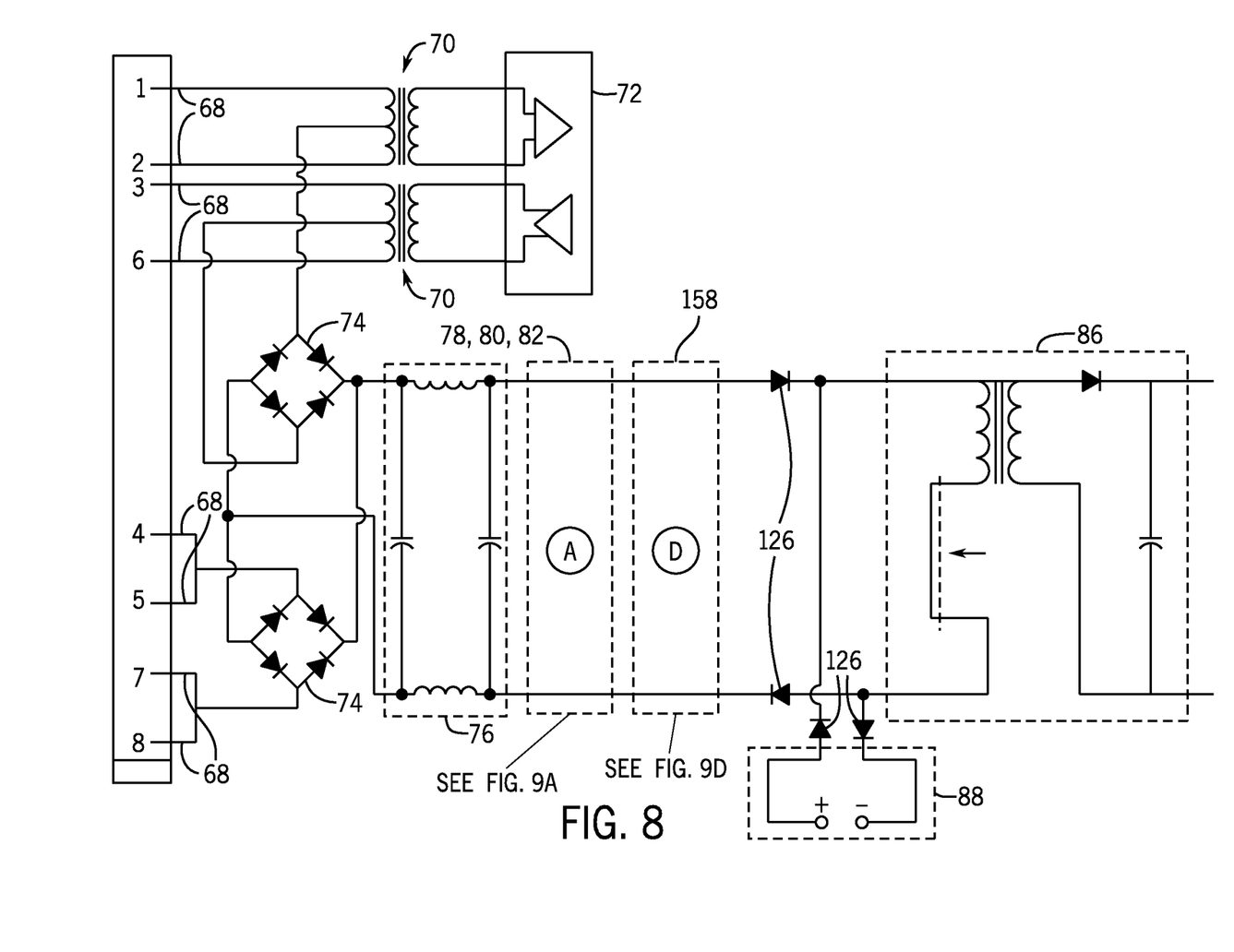
Figure 9D:
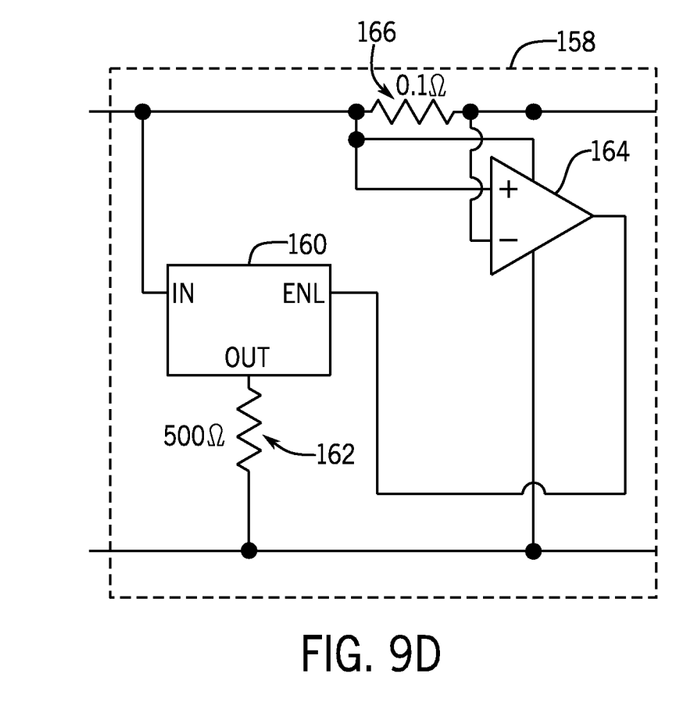

Finally, an exemplary PoE circuit having a minimum load circuit 158 is illustrated in FIG. 8. The minimum load circuit 158 see FIG. 9D) includes a voltage regulator 160. In the illustrated embodiment, the voltage regulator 160 output is 5 volts, however other voltage regulators may be utilized depending on the design of the circuit 158. The output from the voltage regulator 160 is conducted through a resistor 162. The resistor 162 may be designed such that the current flowing therethrough is 10 mA. For example, where a 5 volt regulator 160 is utilized, the resistor 162 may be 500 ohms.

In addition, the minimum load circuit 158 may be turned off upon detection of a current therethrough, as with the minimum load circuit 128 (FIG. 7). That is, if a comparator 164, such as an operational amplifier, detects a voltage drop across a resistor 166, an output voltage is transmitted from the comparator 164 to the regulator 160. The voltage disables the regulator 160, thereby substantially preventing the minimum load circuit 158 from draining current.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An automation system comprising:
a monitoring and/or control component configured to control a machine or process;
an Ethernet network coupled to the monitoring and/or control component for exchanging data during operation of the machine or process;
an input and/or output device coupled to the monitoring and/or control component via the Ethernet network that, in operation, provides data to or receives data from the monitoring and/or control component via the Ethernet network and that is powered by the monitoring and/or control component via a PoE scheme during operation;
an isolation circuit configured to protect the automation component input and/or output device from current supplied by the monitoring and/or control component during the detection of the input and/or output device; and
a switch coupled to a first DC/DC converter downstream of the isolation circuit and to an auxiliary power source through a second DC/DC converter, the switch, in operation, in response to determining that power from the Ethernet network is lost or drops below an acceptable level, switches to the auxiliary power source;
wherein the input and/or output device comprises a minimum load circuit configured to maintain a minimum load for the PoE scheme, and the input/output device comprises a comparator circuit to substantially prevent current through the minimum load circuit when power is provided to the input and/or output device from the Ethernet network.

2. The automation system of claim 1, wherein the minimum load circuit is configured to maintain the minimum load only when the input and/or output device is not powered by power sourcing equipment via an Ethernet connection.

3. The automation system of claim 1, wherein the minimum load circuit comprises a single resistor configured to maintain the minimum load.

4. The automation system of claim 1, wherein the minimum load circuit comprises a voltage regulator and a resistor to maintain the minimum load.

5. The automation system of claim 1, wherein the comparator circuit comprises an operational amplifier, a field-effect transistor, and a resistor to maintain the minimum load.

6. The automation system of claim 1, wherein the minimum load comprises a nominal 10 mA current.

7. An automation system comprising:
an automation component configured to perform an automation operation on a monitored and/or controlled machine or process by exchanging data or signals with an input/output device via an Ethernet network, the input/output device being at least partially powered by power from the Ethernet network;
a PoE circuit, comprising:
a detection circuit configured to enable detection of the input/output device;
an isolation circuit configured to protect the input/output device from current supplied by the Ethernet network during the detection of the input/output device;
a switch coupled to a first DC/DC converter downstream of the isolation circuit and to an auxiliary power source through a second DC/DC converter, the switch, in operation, in response to determining that power from the Ethernet network is lost or drops below an acceptable level, switches to the auxiliary power source;
a minimum load circuit configured to maintain a minimum load on the PoE circuit to enable the detection of the input/output device while the input/output device is powered by an auxiliary power source, and the input/output device comprises a comparator circuit to substantially prevent current through the minimum load circuit when power is provided to the input and/or output device from the Ethernet network.

8. The automation system of claim 7, wherein the PoE circuit comprises a classification circuit configured to enable classification of the input/output device based on the power required by the input/output device.

9. The automation system of claim 7, wherein the minimum load circuit comprises a single resistor configured to maintain the minimum load.

10. The automation system of claim 7, wherein the minimum load circuit comprises a voltage regulator and a resistor to maintain the minimum load.

11. The automation system of claim 7, wherein the comparator circuit comprises an operational amplifier, a field-effect transistor, and a resistor to maintain the minimum load.

12. The automation system of claim 7, comprising a DC/DC converter.

13. The automation system of claim 12, comprising an auxiliary power source connector configured to enable connection of an auxiliary power source on a power input pathway between the PoE circuit and the DC/DC converter.

14. A method comprising:
providing data and power to an automation input/output device via a PoE connection; and
switching a power source for the automation input/output device from an auxiliary power source to a PoE source, wherein switching does not comprise restarting the powered device;
wherein power is provided to the automation input/output device via an isolation circuit configured to protect the automation input/output device from current during the detection of the automation input/output device, and a switch coupled to a first DC/DC converter downstream of the isolation circuit and to an auxiliary power source through a second DC/DC converter, the switch, in operation, in response to determining that power from the PoE source is lost or drops below an acceptable level, switches to the auxiliary power source;
wherein the input/output device comprises a minimum load circuit configured to maintain a minimum load on the PoE connection to enable the detection of the input/output device while the input/output device is powered by an auxiliary power source, and the input/output device comprises a comparator circuit to substantially prevent current through the minimum load circuit when power is provided to the input and/or output device from the PoE source.

15. The method of claim 14, comprising maintaining a minimum load on a PoE connection in the automation input/output device to enable detection of the automation input/output device by the PoE source.

16. The method of claim 15, wherein the minimum load circuit comprises a single resistor configured to maintain the minimum load.

17. The method of claim 15, wherein the minimum load circuit comprises a voltage regulator and a resistor to maintain the minimum load.

18. The method of claim 14, comprising switching to providing power to the input/output device from the PoE source when the PoE source supplies more power than the auxiliary power source.

19. The method of claim 18, comprising providing an auxiliary power connection coupled to the power input pathway after the minimum load circuit.

20. The method of claim 19, comprising providing the auxiliary power connection to the power input pathway after the minimum load circuit via the second DC/DC converter.

* * * * *